Sept 10, 1957  M. R. CANNON  2,805,570
VISCOMETER
Filed April 30, 1954
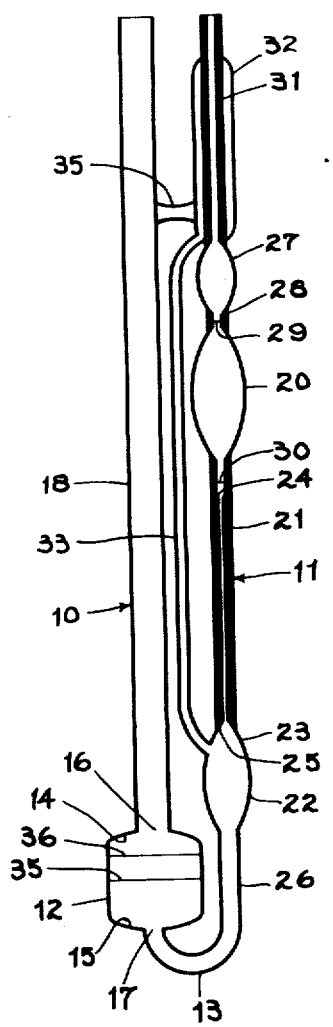
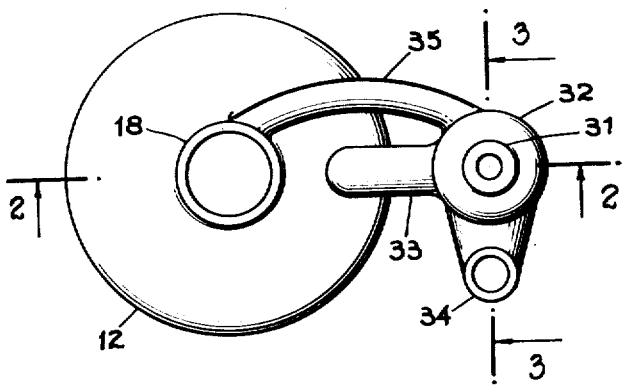
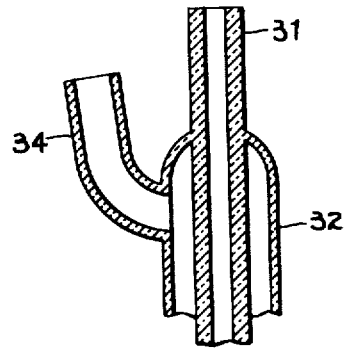
INVENTOR.
MICHAEL R. CANNON
BY Burgess, Ryan & Hicks
ATTORNEYS

United States Patent Office

2,805,570
Patented Sept. 10, 1957

2,805,570

VISCOMETER

Michael R. Cannon, State College, Pa.

Application April 30, 1954, Serial No. 426,680

5 Claims. (Cl. 73—55)

This invention relates to an improved viscometer for accurately measuring the kinematic viscosity of liquids, and more particularly it relates to a viscometer of the Ubbelohde type. As shown by A. S. T. M. Tentative Method D445–53T., Appendix C, the Ubbelohde viscometer is a transparent glass instrument having three glass tubes extending to the top of the same, one tube enabling the instrument to be charged and emptied, a second tube having an efflux vessel or bulb and an outflow bulb with a capillary tube connecting the two bulbs, and a third tube serving as a vent for the outflow bulb. The third tube is quite fragile and subject to being easily broken during handling, particularly when being attached to and removed from the holder which supports the instrument in the constant-temperature bath. A further disadvantage of this instrument arises in connection with the calculation of the viscosity according to the usual equation:

$$KV = Ct - \frac{B}{t}$$

wherein KV is the kinematic viscosity in centistokes, C is a viscometer constant (conventionally determined for each viscometer) $t$ is the efflux time in seconds, and B is the kinetic energy coefficient. The term $$\frac{B}{t}$$

is referred to as the kinetic energy correction. In this equation, B was thought to be a true constant, but actually it is variable, and furthermore it cannot be accurately determined. Hence the accuracy of the equation is reduced. The kinetic energy correction may be particularly significant in the case of Ubbelohde viscometers having small capillaries, or having C constants of 0.05 or less; thus the use of these viscometers may involve appreciable kinetic energy errors.

A principal object of the invention is to provide an improved viscometer of the Ubbelohde type which is not subject to the foregoing disadvantages. Other objects and advantages of the invention will become apparent as the description proceeds.

According to the invention, a viscometer is provided having two strong tubes or branches; the weak third tube extending to the top of the Ubbelohde instrument is eliminated. A stronger instrument is thus produced which is much less subject to breaking; and the holder for supporting the instrument in the bath is simpler since only two strong tubes must fit in it, whereas heretofore it was required to hold three tubes, one of them very fragile. There is further provided an instrument of improved accuracy by virtue of certain changes, hereinafter described, in the design and position of the efflux vessel; one advantageous result of the changes is to eliminate the kinetic energy correction from the above equation and to coincidently simplify the equation to $KV = Ct$.

The invention may be better understood by referring to the accompanying drawings wherein:

Fig. 1 is an enlarged view looking down at the top of the viscometer;

Fig. 2 is a reduced side view, comprising a line drawing, showing how the instrument would appear if a section were taken along the line 2—2 of Fig. 1; and Fig. 3 is a partial sectional view along line 3—3 of Fig. 1.

Generally, the viscometer essentially comprises two strong tubes or branches having three openings to the atmosphere; in one branch are efflux and outflow vessels connected by the working capillary, a tube placing the efflux vessel in communication with the atmosphere, a tube or jacket enclosing the latter tube and open to the atmosphere, and a tube connecting the outflow vessel to the jacket. More particularly, and as shown in the drawings, the instrument comprises a transparent U-shaped tube having two branches 10 and 11. At the lower end of branch 10 is a receiving vessel or bulb 12 adjacent the U-bend 13. Inner annular surfaces 14 and 15 of the vessel adjacent the openings 16 and 17, respectively, are fairly shallow. Vessel 12 is connected to the atmosphere through a tube 18 which is coaxial with the vessel. Both the tube and the vessel have walls of substantial thickness and together constitute a strong branch.

Branch 11 has an efflux vessel 20 which, as shown, tapers from its midpoint to the top and from its midpoint to the bottom thereof to provide a restricted inlet and exit. A length of capillary tube 21 is joined to the lower end of vessel 20 and connects the same to an outflow vessel 22 having a tapered inlet 23 of progressively increasing diameter similar to that of vessel 20. The entrance and exit portions of the capillary are gradually tapered or trumpet-shaped, as seen at 24 and 25. An extension 26 of U-bend 13 is connected to the lower end of the outflow vessel 22. As is apparent, the vessel 22 is disposed above the receiving vessel 12 in branch 10. Above vessel 20 is an overflow bulb 27 which is connected to vessel 20 through a short length of capillary or thick-walled tube 28.

The overflow bulb is of substantially the same shape as, but smaller in size than, the efflux vessel. A gauge mark 29 is provided in tube 28 and another mark 30 just below the vessel 20. A length of thick walled tube 31 is connected to the upper end of the overflow vessel and extends to the top of the instrument. Enclosing the strong tube 31 is a tube or jacket 32 having closed ends and extending from the lower end of tube 31 to a point just short of the top. A long open-ended tube 33 connects the upper portion of the outflow vessel 22 with the lower portion of jacket 32. Tube 33 is protected by being disposed between branch 10 or tube 18 on the one hand and tube 21 and vessel 20 on the other hand, and is not handled by the user of the instrument; it lies substantially in the plane passing through tubes 18 and 21. A short open-ended tube 34 extends from the upper end of the jacket. Brace 35 connects the tube 18 to the lower end portion of the jacket and serves to rigidify both branches.

It will be apparent that the receiving vessel 12 is open to the atmosphere through tube 18, whereas the outflow vessel 22 is open to the atmosphere through two separate paths, one path comprising the capillary tube 21, efflux vessel 20, overflow vessel 27, and thick walled tube 31, and the second path comprising the long tube 33, jacket 32, and short tube 34.

The capacity of efflux vessel 20 is about 0.5 to 3.0 ml., being about 10 to 80% smaller than heretofore. By means of this change the kinetic energy correction is eliminated from the first noted equation. Vessel 20 is also located a greater distance from the top of the instrument, being now about 35 to 45%, preferably about 40% or two-fifths, of the way down from the top; formerly it was only about 30% of the way down. This change is to insure that the efflux vessel will always be well below the surface of the bath liquid. The dimensions of the instrument are variable to some extent; for example, the over-all height or length may be about 260 to 800 mm., the length of tube 31 about 100 to 300 mm., the length of the working capillary or tube 21 about 85 to 600 mm., the distance from the lower end of the working capillary to the midpoint of vessel 20 about 100 to 650 mm., the distance between the centers of tubes 18 and 31 about 19 to 30 mm., and the distance between the centers of tubes 31 and 34, measured along an inclined line connecting the tops of the tubes, about 10.5 to 20 mm. The diameter of the working capillary may range from 0.30 to 6.0 mm.

The instrument may be used for measuring the viscosity of liquids just as the Ubbelohde viscometer, and has a range of 0.3 to 50,000 centistokes. It may be charged without removing it from the constant-temperature bath by pouring sufficient liquid sample into tube 18 to bring the level in vessel 12 somewhere between filling lines 35 and 36. About 6 to 12 ml. of liquid are required for a test. After the liquid has reached temperature equilibrium, the operator places his finger over the end of tube 34 and applies suction to tube 31 until the liquid reaches about the center of vessel 27, liquid also being drawn up in tube 33. The suction is then removed, the operator removes his finger from tube 34, and the liquid drops away from the lower end of the working capillary. The liquid in tube 33 drains very quickly, since the latter has a larger diameter than the capillary, and air then passes into vessel 22 through tube 33. When the meniscus of the liquid reaches the gauge mark 29, a stop watch or stop clock is started and the time for the meniscus to reach the gauge mark 30 is measured. The kinematic viscosity in centistokes is obtained by multiplying the measured time in seconds by the constant C, the latter having been previously determined for the instrument. It may be noted that during the test, liquid entering the vessel 22 from the capillary flows down along the walls of the vessel.

In the light of the foregoing description, the following is claimed:

1. In a viscometer comprising an efflux vessel, an outflow vessel, a length of capillary tube connecting the efflux vessel to the outflow vessel, an upper and a lower gauge mark for the efflux vessel, the improvement comprising an upper open-ended tube communicating with the efflux bulb and extending to the top of the viscometer, a jacket enclosing said latter tube, a short open-ended tube extending from the jacket and being in communication therewith, said short tube having a free end open to the atmosphere, and a long open-ended tube connecting the jacket with the outflow vessel, said outflow vessel being open to the atmosphere through two entirely separate paths, one path comprising said length of capillary tube, the efflux vessel, and said upper tube, and the second path comprising said long tube, said jacket, and said short tube, and said long open-ended tube being protected against breakage during the handling of the viscometer by the components of said one path.

2. A U-shaped viscometer comprising two strong branches; one branch having a receiving bulb at the lower end portion thereof; the other branch having an efflux vessel, an outflow vessel, a first length of capillary tube connecting the efflux vessel to the outflow vessel, a tube placing the efflux vessel in communication with the atmosphere, a second tube of larger diameter than and enclosing a substantial length of said first tube, said second tube being fixedly secured to the first tube, said second tube having an opening to atmosphere at the upper end portion thereof, a third tube connecting the outflow vessel to the lower end portion of the second tube, thereby placing the outflow vessel in communication with the atmosphere, said third tube lying substantially in a plane passing through the capillary tube and said first branch, said third tube extending between the capillary tube and first branch; and the upper end portion of said viscometer presenting substantial lengths of only two tubes adapted to be engaged by a holder for supporting the viscometer in a constant-temperature bath.

3. A viscometer comprising two strong tubes; one tube having a receiving vessel; the other tube having an efflux vessel, an outflow vessel, a length of capillary tube connecting the efflux vessel to the outflow vessel, an upper and a lower gauge mark for the efflux vessel, an upper open-ended tube communicating with the efflux bulb and extending to the top of the viscometer, a jacket enclosing said upper tube, a short open-ended tube in communication with the jacket and having a free end open to the atmosphere, and a long open-ended tube connecting the jacket with the outflow vessel, said long tube lying between, and being of shorter length than, said two strong tubes and being protected by the latter; said outflow vessel being open to the atmosphere through two separate paths, one path comprising said length of capillary tube, the efflux vessel, and said upper tube, and the second path comprising said long tube, said jacket, and said short tube.

4. In an Ubbelohde type viscometer comprising an efflux vessel, an outflow vessel, a length of capillary tube connecting the exit end of the efflux vessel to the inlet of the outflow vessel, an upper and a lower gauge mark for the efflux vessel, the improvement comprising an overflow vessel connected to the upper end of the efflux vessel, an open-ended thick-walled tube connected to the overflow vessel and extending to the top of the viscometer, a jacket enclosing said thick-walled tube and extending to a point short of the top thereof, a short open-ended tube extending upwardly from the upper end of the jacket and being in communication with the jacket, a long open-ended tube connecting the lower end of the jacket with the upper end of the outflow vessel, said efflux vessel being spaced about two-fifths of the way down from the top of said thick-walled tube and having a volume of 0.5 to 3.0 ml.; said outflow vessel being open to the atmosphere through two separate paths, one path comprising said length of capillary tube, the efflux vessel, and said thick-walled tube, and the second path comprising said long tube, said jacket, and said short tube.

5. An Ubbelohde type viscometer comprising a transparent U-shaped tube having two strong branches; one branch having a receiving vessel at the lower end portion thereof adjacent the U-bend; the other branch having an efflux vessel spaced about two-fifths of the way down from the top thereof, said efflux vessel having a volume of 0.5 to 3.0 ml., an outflow vessel at the lower end portion of said other branch, a length of capillary tube connecting the exit or lower end of the efflux vessel to the inlet of the outflow vessel, a thick-walled tube in communication with the upper end of the efflux vessel, an upper and a lower gauge mark for the efflux vessel, said thick-walled tube having an open upper end at substantially the same level as the upper open end of said first branch, a jacket enclosing said thick-walled tube and extending from the lower end portion thereof to a point short of said open upper end, a short open-ended tube extending upwardly from the upper end of the jacket and being in communication wit the jacket, a long open-ended tube connecting the lower end of the jacket with the upper end of the outflow vessel, and a brace connecting the jacket to said first branch; said outflow vessel being open to the atmosphere through two separate paths, one path comprising said length of capillary tube, the efflux vessel, and said thick-walled tube, and the second path comprising said long tube, said jacket, and said short tube.

References Cited in the file of this patent

UNITED STATES PATENTS

| 2,048,305 | Ubbelohde | July 21, 1936 |
| 2,095,282 | Payne | Oct. 12, 1937 |

UNITED STATES PATENT OFFICE

CERTIFICATE OF CORRECTION

Patent No. 2,805,570                                          September 10, 1957

Michael R. Cannon

It is hereby certified that error appears in the printed specification of the above numbered patent requiring correction and that the said Letters Patent should read as corrected below.

Column 3, line 63, strike out "first" and insert the same after "a" in line 65, same column.

Signed and sealed this 5th day of November 1957.

(SEAL)

Attest:
KARL H. AXLINE
Attesting Officer

ROBERT C. WATSON
Commissioner of Patents